(12) United States Patent
Fan (10) Patent No.: US 11,447,053 B1
(45) Date of Patent: Sep. 20, 2022

(54) RETRACTABLE CUP HOLDER

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 0 days.

(21) Appl. No.: 17/338,981

(22) Filed: Jun. 4, 2021

(51) Int. Cl.
*B60N 3/10* (2006.01)

(52) U.S. Cl.
CPC ............ *B60N 3/106* (2013.01); *B60N 3/103* (2013.01)

(58) Field of Classification Search
CPC ................................ B60N 3/106; B60N 3/103
USPC .......................................................... 224/544
See application file for complete search history.

(56) References Cited

U.S. PATENT DOCUMENTS

| | | | | |
|---|---|---|---|---|
| 4,118,002 A * | 10/1978 | Bartlett | ................... | F16M 11/42 248/311.2 |
| 4,943,111 A * | 7/1990 | VanderLaan | ........... | B60N 3/106 297/188.17 |
| 5,149,032 A * | 9/1992 | Jones | ................. | A47G 23/0225 248/316.4 |
| 5,154,380 A * | 10/1992 | Risca | ..................... | B60N 3/101 248/154 |
| 5,398,898 A * | 3/1995 | Bever | ..................... | A47J 43/18 248/154 |
| D370,403 S * | 6/1996 | Schenken | ....................... | D8/355 |
| 5,533,700 A * | 7/1996 | Porter | .................... | B60N 3/101 248/311.2 |
| 5,560,578 A * | 10/1996 | Schenken | .............. | B60N 3/106 248/229.21 |
| D407,951 S * | 4/1999 | Philipson | .................... | D7/619.1 |
| D428,302 S * | 7/2000 | Miller | .......................... | D7/619.1 |
| D428,308 S * | 7/2000 | Hartmann | ................... | D7/619.1 |
| 6,113,049 A * | 9/2000 | Miljanich | ............... | B60N 3/103 248/314 |
| D431,423 S * | 10/2000 | Ohm | .............................. | D7/620 |
| 6,705,580 B1 * | 3/2004 | Bain | ...................... | B60N 3/106 248/311.2 |
| 6,892,994 B1 * | 5/2005 | Renshaw | ................ | F16M 13/02 248/316.5 |
| 7,607,629 B1 * | 10/2009 | Carrasco | ................... | A61J 9/06 248/102 |
| 9,115,843 B2 * | 8/2015 | Huang | .................... | F16M 13/00 |
| 9,162,630 B2 * | 10/2015 | Pluta | ....................... | B60R 11/02 |
| 9,969,312 B2 * | 5/2018 | Stiver | ..................... | B60N 3/102 |
| 10,562,430 B1 * | 2/2020 | Veillon | ................... | B60N 3/103 |

(Continued)

*Primary Examiner* — Nathan J Newhouse
*Assistant Examiner* — Lester L Vanterpool
(74) *Attorney, Agent, or Firm* — Lin & Associates Intellectual Property, Inc.

(57) ABSTRACT

A retractable cup holder is provided, including: a main base, disposed with a plurality of guide grooves inside located at different heights, and with a placement surface as a top; a gear set, located inside the main base; at least three surrounding arms, each including a sliding element and a surrounding element connected to each other, the sliding element being located movably in the corresponding guide groove; the plurality of the surrounding elements being erected around the main base, each peripheral gear being positioned corresponding to the sliding element, and the actuating gear meshing with the actuating rack; when one of the surrounding arms moving, the rest of the surrounding arms moving synchronously through the meshed gear set; a stopper; partially restricted in the main base but movable for a short distance; after the stopper engaging a sliding element, the surrounding arm becoming unable to move.

6 Claims, 7 Drawing Sheets

(56) References Cited

U.S. PATENT DOCUMENTS

| | | | | |
|---|---|---|---|---|
| 10,596,945 B2 * | 3/2020 | Siddiqui | ................ | B60N 3/106 |
| 10,609,872 B2 * | 4/2020 | Rentzhog | ................ | A01G 9/042 |
| 2010/0295228 A1 * | 11/2010 | Woody | ................ | B60R 11/0258 269/254 R |
| 2019/0183240 A1 * | 6/2019 | Floco | ................ | B60N 3/103 |

* cited by examiner

RETRACTABLE CUP HOLDER

BACKGROUND OF THE INVENTION

1. Field of the Invention

The present invention relates generally to a cup holder, and more particularly, to a retractable cup holder with adjustable accommodation size.

2. The Prior Arts

Cars are usually equipped with at least one set of cup holders for drivers or passengers to place canned drinks or cups. However, with the increase in the use of electronic products, the old equipment in the car is no longer suitable for use. Some manufacturers have designed a bearing bracket for mounting on the cup holder, and then additional clamping devices, extension platforms, and so on can be added to the bearing bracket for drivers or passengers to hold a mobile phone or use for other purposes. In addition, some drivers use popcorn buckets to carry a large amount of popcorn for consumption in the car to avoid boring long-distance driving. However, ordinary vehicles do not have such a structure for holding large popcorn bucket. Usually, the popcorn bucket is placed on the passenger seat. On sudden brakes or fast turning, the popcorn bucket will be tipped over. However, the frequency of using such a special bearing is often limited while taking up much space in the car. For this reason, it is desirable to develop a flexible solution.

SUMMARY OF THE INVENTION

A primary objective of the present invention is to provide a retractable cup holder, which is surrounded by at least three movable arms to form an accommodating area, thereby providing adjustable accommodating sizes to accommodate objects of various sizes, such as, general water cups, canned containers, large-size mugs, or even popcorn buckets. However, the present invention can also be used for placing other containers of different purposes and sizes to meet the different needs of users.

To achieve the aforementioned objective, the retractable cup holder of the present invention includes: a main base, a gear set, at least three surrounding arms and a stopper; the top of the main base has a placement surface, and a plurality of guide grooves are disposed inside located at different heights and communicating with the outside; the gear set is located in the bottom area of the main base, and the gear set includes a central gear and at least three peripheral gears, the at least three peripheral gears surround and mesh with the central gear, and each peripheral gear further includes a protruding actuating gear; each of the surrounding arms includes a sliding element and a surrounding element connected to each other, the sliding element is located movably in the corresponding guide groove; the plurality of the surrounding elements are erected around the main base, and each sliding element has a channel, and the channel has a vertical wall having an actuating rack; each peripheral gear is positioned corresponding to the sliding element, and the actuating gear meshes with the actuating rack; when one of the surrounding arms moves, the rest of the surrounding arms move synchronously through the meshed gear set; one of the sliding element has a positioning rack on a vertical outer wall; the stopper is partially restricted in the main base but movable for a short distance, the stopper has a convex tooth; after the stopper moves, the surrounding arm cannot be moved when the convex tooth is engaged with the positioning rack.

In a preferred embodiment, the main base is a hollow shell formed by a base and a cover, with a partition inside, and two guide grooves with two different orientations are respectively formed on upper and lower surfaces of the partition; another guide groove is formed on the bottom of the cover facing the partition; the outer wall of the base is provided with a plurality of notches corresponding to the positions of the guide grooves, after the base, the partition and the cover are assembled, the guide groove is still in communication with the outside, so that the plurality of sliding elements can slide in the guide grooves of different heights without interfering with each other.

In a preferred embodiment, the stopper has a neck, the base has two guide walls, and the distance between the two guide walls is larger than the size of the neck; after assembly, the guide walls are located on both sides of the neck, so that the stopper can move in a short distance between the two guide walls without being separated.

In a preferred embodiment, the number of peripheral gears is equal to the number of surrounding arms.

In a preferred embodiment, the main base has a cylindrical body, the surrounding element is arc-shaped, and the plurality of surrounding elements is distributed around the main base.

In a preferred embodiment, the present invention is installed on a supporting bracket, the supporting bracket includes a cup holder unit, a base unit, a rotating unit and a plurality of expansion units, the cup holder unit is made by the above-mentioned cup holder with a structure of a main base, a gear set and at least three surrounding arms; the cup holder unit is pivotally connected to an extension piece of the base unit, and is adjustable to different orientations by turning; the base has an outer wall disposed with a plurality of via holes arranged in a surrounding manner; the rotating unit is installed on the base unit and rotatable but not disengaged; the plurality of expansion units are installed in the base unit through the via holes in the corresponding positions; when the rotating unit rotates, the rotating unit is linked with the expansion unit, and the plurality of expansion units will extend outward through the corresponding via holes.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
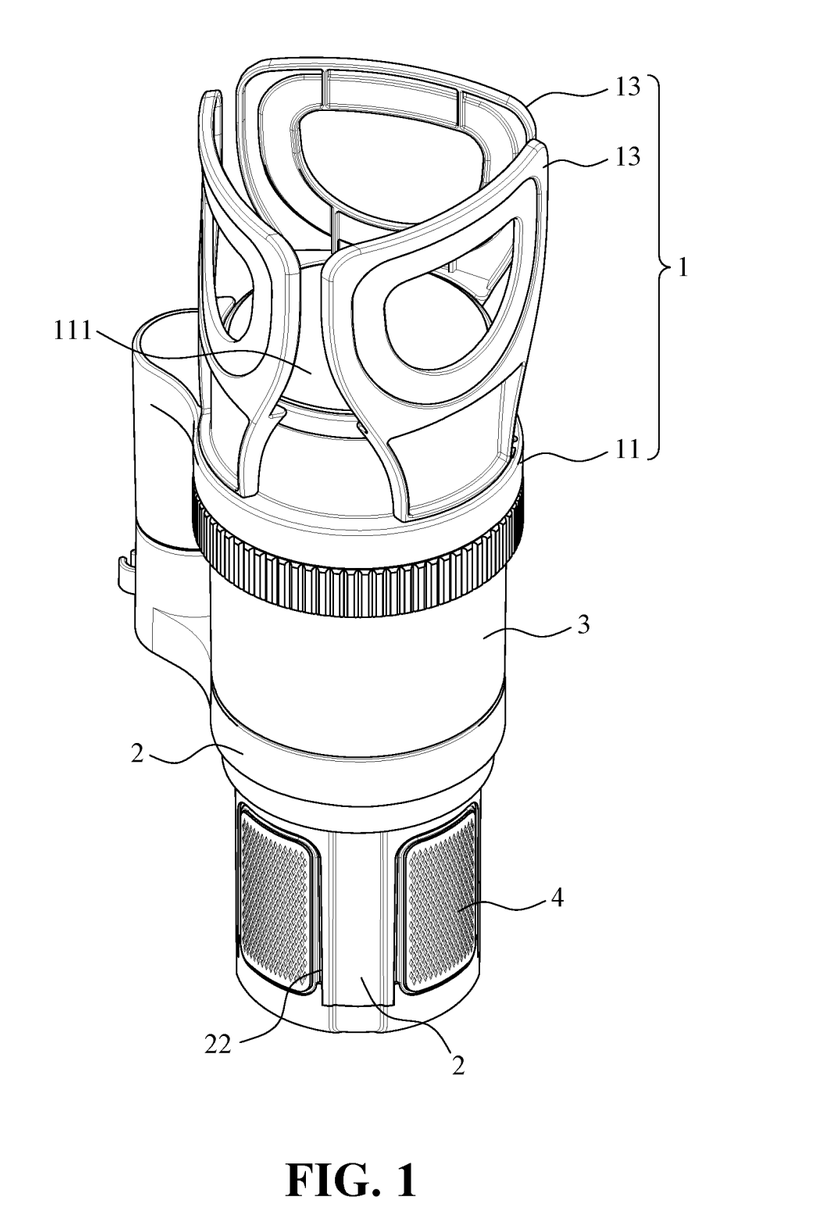
FIG. 1 is a structural schematic view of the supporting bracket of the retractable cup holder according to the present invention.
Figure 2:
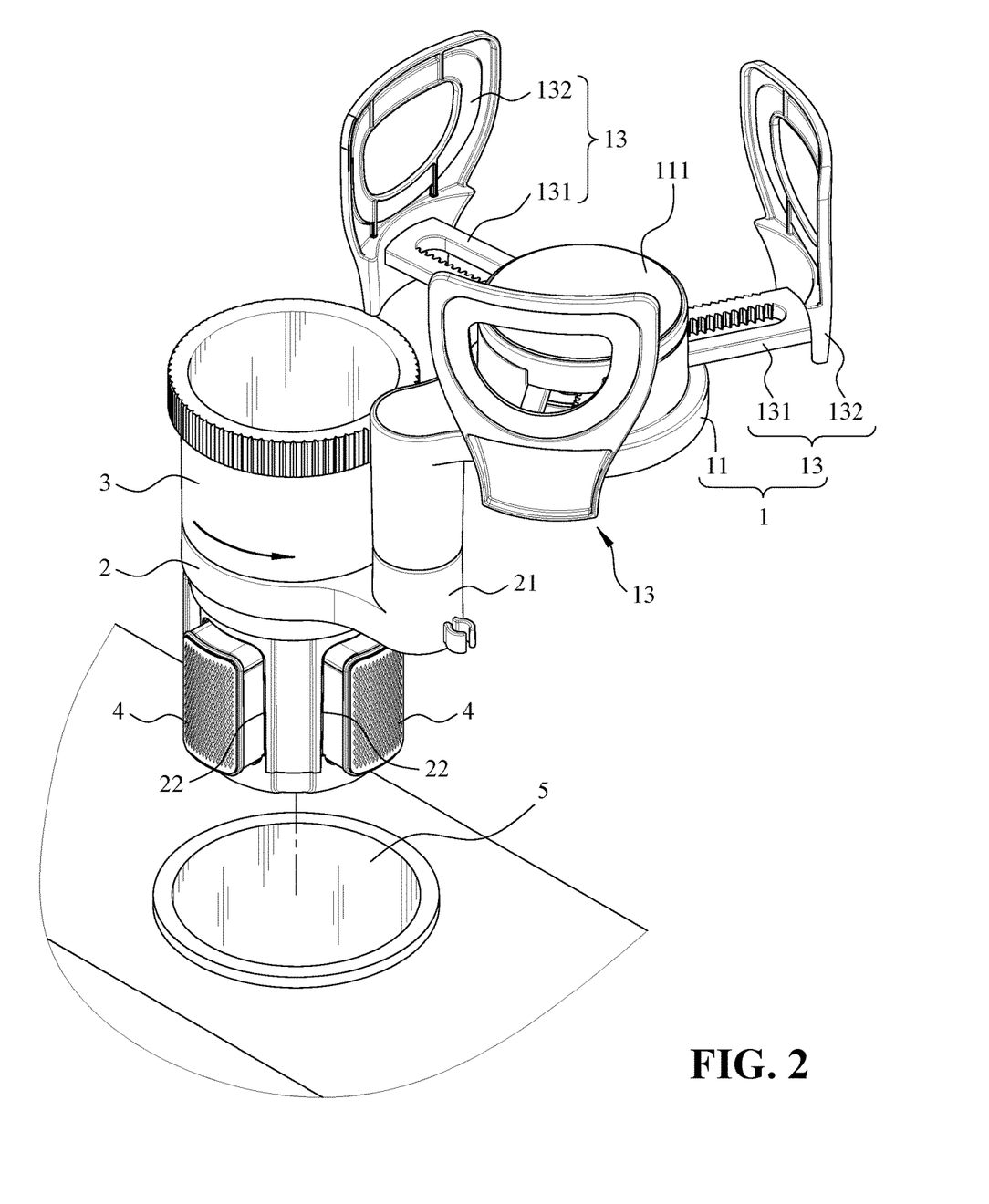
FIG. 2 is a schematic view of the use of the supporting bracket of the retractable cup holder according to the present invention.

FIG. 1 and FIG. 2 show a structural view and the view of the use of the supporting bracket with the retractable cup holder of the present creation. The supporting bracket of the retractable cup holder of the invention includes a cup holder unit 1, a base unit 2, a rotating unit 3, and a plurality of expansion units 4. As shown in FIG. 2, the cup holder unit 1 is pivotally connected to an extension piece 21 of the base unit 2, which can be adjusted to different orientations by turning when in use. The cup holder unit 1, after adjustment, can provide placement for containers of different sizes. A plurality of via holes 22 are arranged around the outer wall of the base unit 2. The rotating unit 3 is mounted on the base unit 2 and can be rotated but not separated from. A plurality of the expansion units 4 are installed in the base unit 2 through the via holes 22 at corresponding positions. When the rotating unit 3 rotates, the rotating unit 3 is linked with the expansion units 4, and the plurality of expansion units 4 will linearly move through the corresponding via holes 22 and extend outward. In actual use, the base unit 2 is placed in a cup holder structure 5 in the car, and the expansion unit 4 moves outward and presses against the inner wall of the cup holder structure 5 to achieve the purpose of fixation. In the present embodiment, the upper half of the rotating unit 3 is a container with an opening facing upward, but it is not limited thereto, and may be designed in other shapes for other purposes. Moreover, in the present embodiment, the linkage mode of the base unit 2, the rotating unit 3, and the expansion unit 4 is only one of many usage types, but it is not limited thereto, and may be designed into various types according to the needs of the manufacturer.

Figure 3:
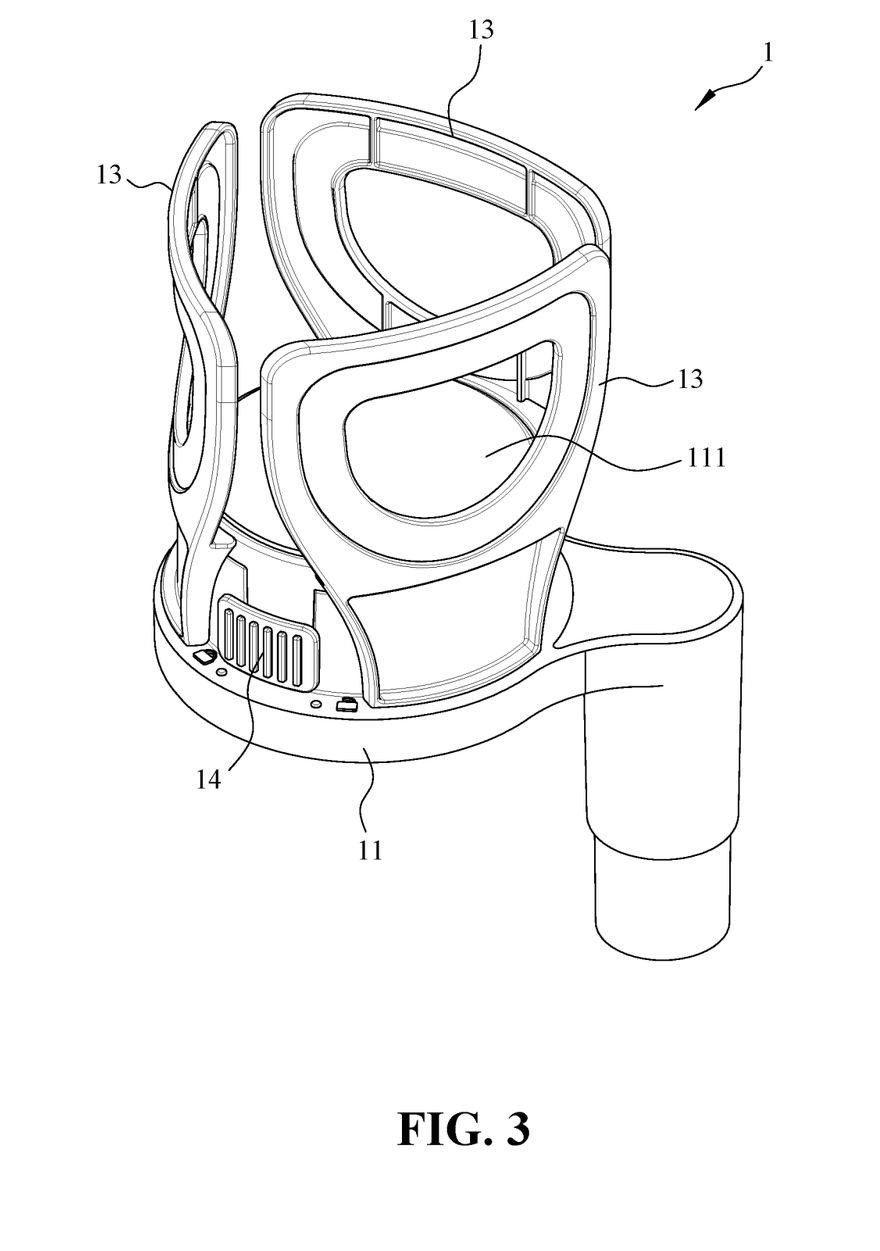
FIG. 3 is a structural schematic view of the retractable cup holder according to the present invention.
Figure 4:
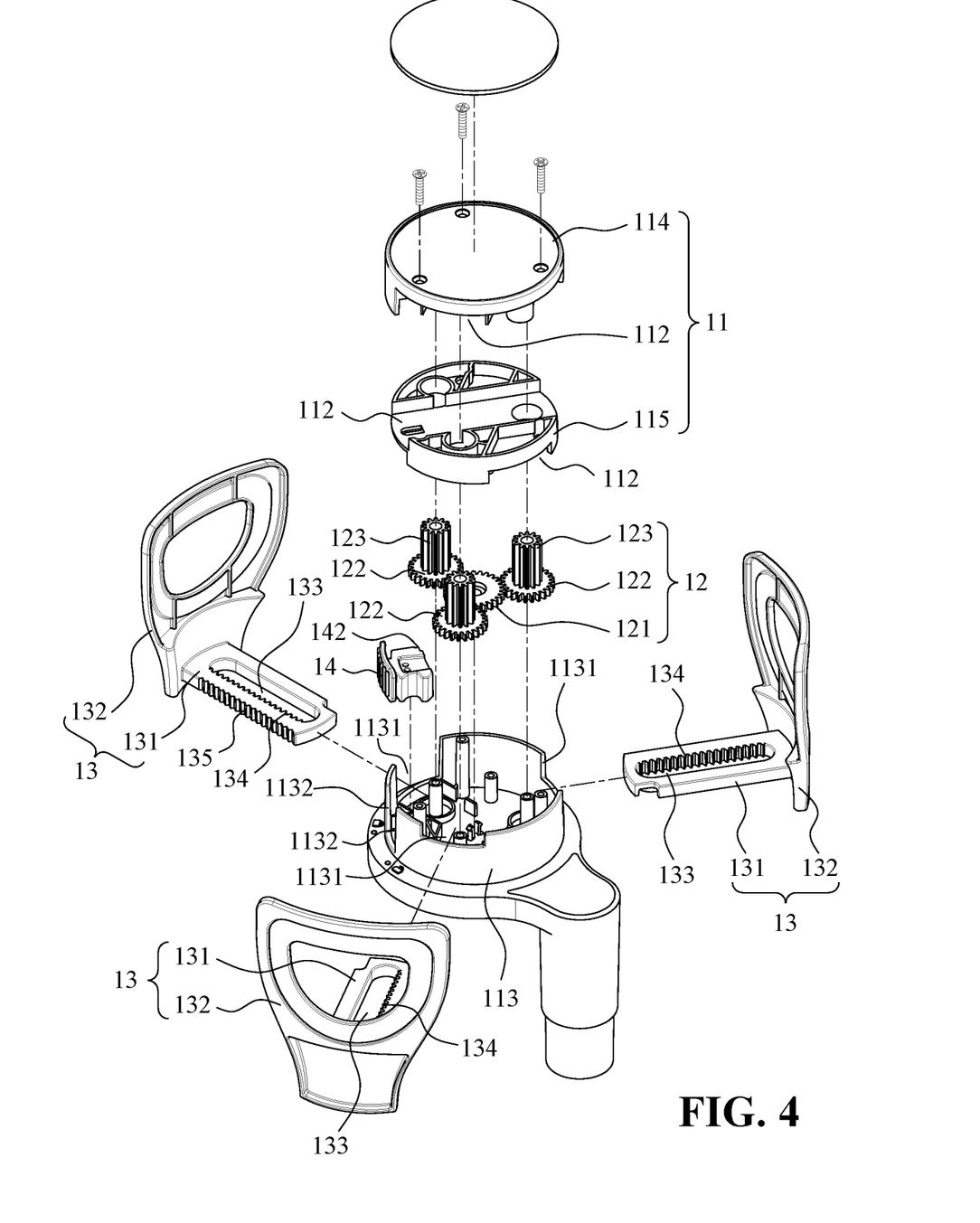
FIG. 4 is a dissected schematic view of the retractable cup holder according to the present invention.

The main feature of the present invention is that the structure of the cup holder unit 1 is retractable, so that the accommodation volume is variable, as shown in FIGS. 1 and 2. Refer to FIGS. 3 and 4. The cup holder unit 1 includes a main base 11, a gear set 12, at least three surrounding arms 13 and a stopper 14. The surrounding arm 13 includes a sliding element 131 and a surrounding element 132 connected to each other. A plurality of the sliding elements 131 extend into the main base 11 and can be moved synchronously by the meshing of the gear set 12, and a plurality of the surrounding elements 132 stand upright and surround the main base 11, a plurality of surrounding elements 132 form an area for placement. The stopper 14 is installed on the main base 11, and after being pressed and pushed, the stopper will contact one of the sliding elements 131 and stop the movement, thereby fixing the area enclosed by the plurality of surrounding elements 132 and providing various accommodating sizes for different usages.

The following is a detailed description of the structure of each component of the present invention:

The top of the main base 11 is a placement surface 111 for placing cups or containers. The main base 11 is provided with a plurality of guide grooves 112 at different heights, the guide grooves 112 communicate with the outside, and each guide groove 112 is provided with the corresponding sliding element 131 and can slide therein. In the present embodiment, the number of the guide grooves 112 is three, and they are distributed at different heights at equal intervals. The main base 11 has a central cylindrical body, and the innermost area is provided for the gear set 12 to be disposed, and the area above the gear set 12 forms the above-mentioned plurality guide grooves 112. The structure of the main base 11 can be constructed in many different ways, and the present invention will only illustrate one exemplar.

In the present embodiment, the main base 11 is a hollow shell formed by a base 113 and a cover 114, but there is also a partition 115 inside. Two guide grooves 112 with different orientations are respectively formed on the upper and lower sides of the partition 115, and another guide groove 112 is also formed at the bottom of the cover 114 facing the partition 115. The surrounding outer wall of the main base 113 is provided with a plurality of notches 1131 corresponding to the positions of the guide grooves 112, so that after the base 113, the partition 115 and the cover 114 are assembled, the guide groove 112 is still in communication with the outside. As such, a plurality of the sliding elements 131 can slide in the guide grooves 112 of different heights without interfering with each other, so that the sliding distance can reach the maximum value; at this point, the accommodation size range of the plurality of surrounding elements 132 of the present invention is the largest.

Figure 5:
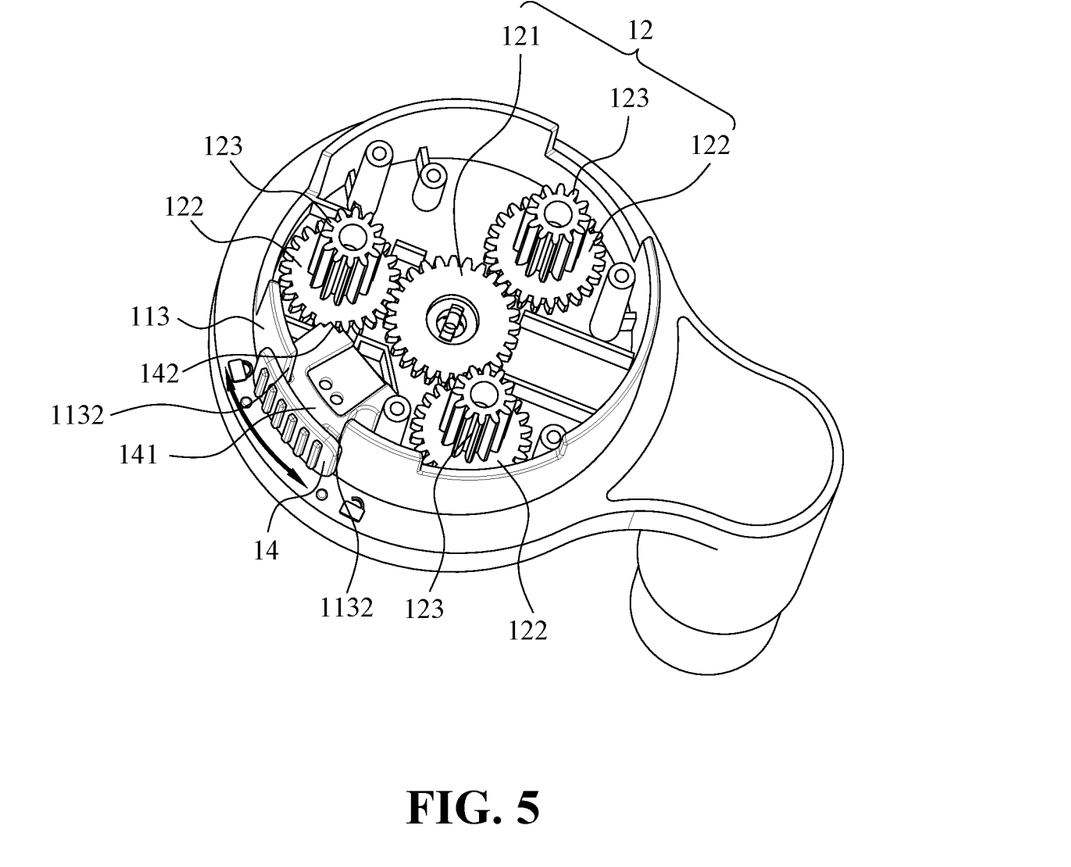
FIG. 5 is a partial structural schematic view of the retractable cup holder according to the present invention.

The gear set 12 includes a central gear 121 and at least three peripheral gears 122. The plurality of the peripheral gears 122 mesh around the central gear 121, and each of the peripheral gears 122 is disposed with an actuating gear 123 protruding upward. As shown in FIG. 5, the gear set 12 is installed in the base 113. When one of the peripheral gears 122 rotates and is linked by the central gear 121, the other peripheral gears 122 can also rotate synchronously. Each actuating gear 123 is responsible for driving the corresponding sliding element 131 to move.

The surrounding arm 13 includes the sliding element 131 and the surrounding element 132 connected to each other. The sliding element 131 moves in the corresponding guide groove 112, and the plurality of the surrounding elements 132 stand upright around the main base 11, and the surrounding elements 132 are arc-shaped. Moreover, each sliding element 131 has a channel 133. The channel 133 has a vertical wall with an actuating rack 134. Each of the peripheral gears 122 corresponds to one of the sliding elements 131, and the actuating gear 123 and the corresponding actuating rack 134 mesh with each other, so that when one of the surrounding arms 13 moves, the meshed gear set 12 will cause the remaining surrounding arms 13 to move synchronously. In addition, the vertical outer wall of the sliding element 131 of one of the surrounding arms 13 further has a positioning rack 135.

Figure 6:
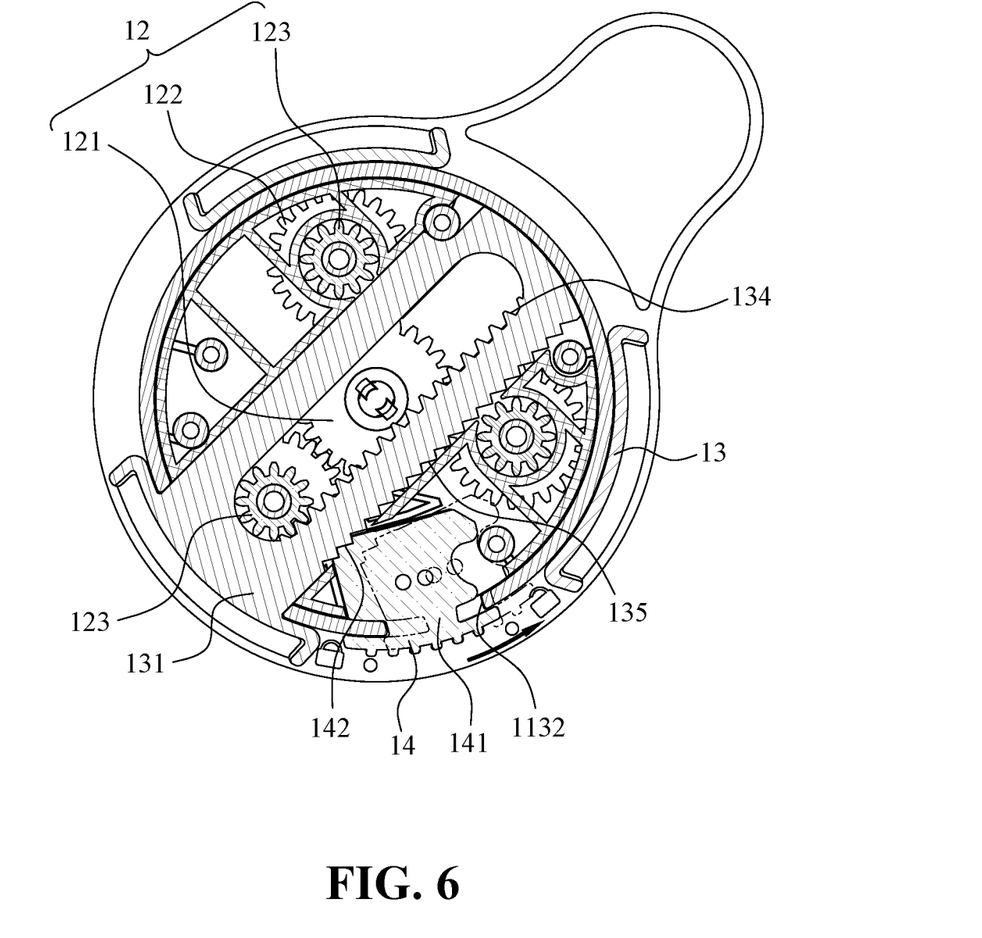
FIG. 6 is a cross-sectional schematic view of actuation of the stopper of the retractable cup holder according to the present invention.

The stopper 14 is installed on the main base 11 and can be moved for a short distance. Specifically, the stopper 14 is partially restricted in the base 13, so that the stopper 14 can moves a short distance along the outer wall of the base 13 when pushed. As shown in FIGS. 4, 5, and 6, the stopper 14 has a neck 141, and the base 13 has two guide walls 1132. The distance between the two guide walls 1132 is larger than the size of the neck 141. After assembling, the guide wall 1132 is located on both sides of the neck 41, so that the stopper 14 can move a short distance between the two guide walls 1132 without being separated. Moreover, the stopper 14 is located at a high position and will not contact the peripheral gear 122. Refer to FIG. 6, the stopper 14 further has a protruding tooth 142, and the protruding tooth 142 is responsible for blocking the movement of one of the sliding elements 131 to achieve the purpose of locking. When the stopper 14 is pushed and the protruding teeth 142 are in contact with the positioning rack 135, one of the sliding elements 31 can no longer move. Due to the meshing of the gear set 12, all the surrounding arms 13 are also fixed to the adjusted position.

Figure 7:
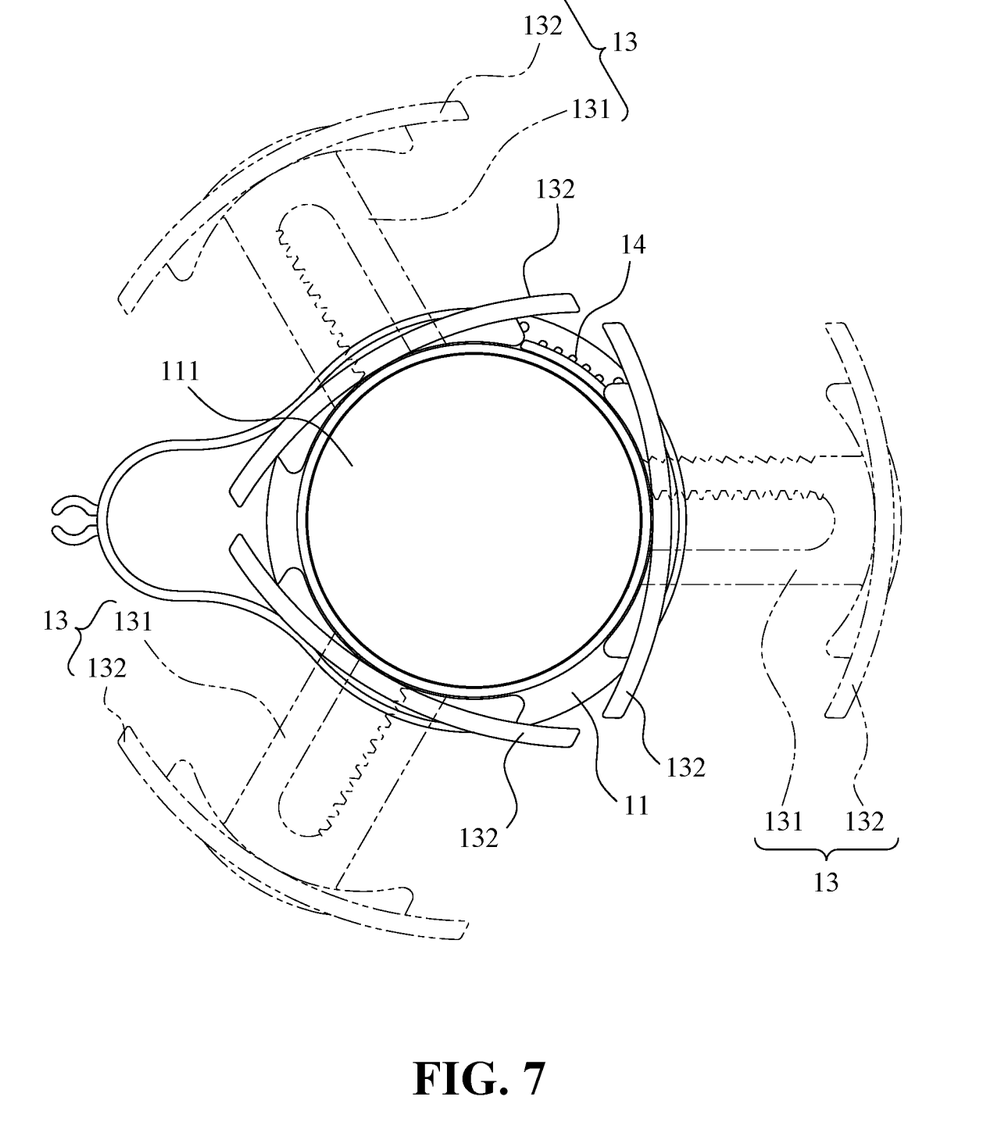
FIG. 7 is a schematic view of the actuation of the plurality of surrounding arms of the retractable cup holder according to the present invention.

In summary, the retractable cup holder of the present invention uses the movable retractable surrounding arm 13 of the cup holder unit 1 with the, as shown in FIG. 1, FIG. 2 and FIG. 7, to achieve an adjustable accommodation size to meet the needs of actual use. The stopper 14 is used to lock the adjusted position for requirements of actual use. The present invention can be fixed to the cup holder structure 5 in the car when applied to the supporting bracket with the retractable cup holder, and can provide a retractable cup holder with variable accommodation sizes to meet the needs of users and meet the patent requirements.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A retractable cup holder, comprising:
   a main base, disposed with a plurality of guide grooves inside located at different heights, and with a placement surface as a top;
   a gear set, located in a bottom area of the main base, and the gear set comprising: a central gear and at least three peripheral gears, the at least three peripheral gears surrounding and meshing with the central gear, and each of the at least three peripheral gears further comprising a protruding actuating gear;
   at least three surrounding arms, each of the at least three surrounding arms comprising a sliding element and a surrounding element connected to each other, the sliding element being located movably in a corresponding guide groove of the plurality of guide grooves; each of the surrounding elements of the at least three surrounding arms being erected around the main base, and each sliding element having a channel, and the channel having a vertical wall with an actuating rack; each of the at least three peripheral gears being positioned corresponding to the sliding element, and the protruding actuating gear meshing with the actuating rack; when one of the at least three surrounding arms moves, the rest of the at least three surrounding arms moving synchronously through the meshed gear set; one of the sliding element having a positioning rack on a vertical outer wall; and
   a stopper; partially restricted in the main base but movable for a short distance, and having a convex tooth; after the stopper moving, the at least three surrounding arms becoming unable to move when the convex tooth becomes engaged with the positioning rack.

2. The retractable cup holder according to claim 1, wherein the main base is a hollow shell formed by a base and a cover, with a partition inside, and two guide grooves of the plurality of guide grooves with two different orientations are respectively formed on upper and lower surfaces of the partition; another guide groove of the plurality of guide grooves is formed on the bottom of the cover facing the partition; an outer wall of the base is provided with a plurality of notches corresponding to positions of the plurality of guide grooves, after the base, the partition and the cover are assembled, each of the plurality of the guide grooves is still in communication with outside, so that the sliding element of each of the at least three surrounding arms can slide in the corresponding guide groove without interfering with each other.

3. The retractable cup holder according to claim 2, wherein the stopper has a neck, the base has two guide walls, and the distance between the two guide walls is larger than the size of the neck; after assembly, the two guide walls are located on both sides of the neck, so that the stopper can move in a short distance between the two guide walls without being separated.

4. The retractable cup holder according to claim 1, wherein the number of the at least three peripheral gears is equal to the number of the at least three surrounding arms.

5. The retractable cup holder according to claim 1, wherein the main base has a cylindrical body, the surrounding element is arc-shaped, and the at least three surrounding arms are distributed around the main base.

6. The retractable cup holder according to claim 1, wherein the retractable cup holder is installed on a supporting bracket, the supporting bracket comprising a base unit, a rotating unit and a plurality of expansion units; the retractable cup holder is pivotally connected to an extension piece of the base unit, and is adjustable to different orientations by turning; the base unit has an outer wall disposed with a plurality of via holes arranged in a surrounding manner; the rotating unit is installed on the base unit and rotatable but not disengaged; the plurality of expansion units are installed in the base unit through the plurality of via holes in corresponding positions; when the rotating unit rotates, the rotating unit is linked with the plurality of expansion unit, and the plurality of expansion units extend outward through the corresponding plurality of via holes.

* * * * *